United States Patent [19]

Heller

[11] 4,126,978
[45] Nov. 28, 1978

[54] APPARATUS FOR INTERCONNECTING PANELS

[76] Inventor: Stephen M. Heller, 2300 Bridgeway, Sausalito, Calif. 94965

[21] Appl. No.: 864,310

[22] Filed: Dec. 27, 1977

[51] Int. Cl.² .............................................. E04C 2/30
[52] U.S. Cl. ...................................... 52/461; 52/586; 52/280; 52/732
[58] Field of Search ................ 52/280, 281, 238, 241, 52/461, 464, 282, 242, 730–732, 586, 243

[56] References Cited

U.S. PATENT DOCUMENTS

| 3,509,673 | 5/1970 | Witkosky et al. | 52/242 |
| 3,585,768 | 6/1971 | Klein | 52/731 |
| 3,640,039 | 2/1972 | McKee | 52/281 |
| 3,875,721 | 4/1975 | Mengeringhausen et al. | 52/731 |
| 3,973,371 | 8/1976 | Heller | 52/280 |
| 4,065,904 | 1/1978 | Taylor et al. | 52/731 |

FOREIGN PATENT DOCUMENTS

| 264,087 | 8/1968 | Austria | 52/731 |
| 936,145 | 9/1963 | United Kingdom | 52/238 |

*Primary Examiner*—James L. Ridgill, Jr.
*Attorney, Agent, or Firm*—Townsend and Townsend

[57] ABSTRACT

Apparatus for interconnecting panels is disclosed which includes a plurality of members which are attached to panel edges and a plurality of core elements. Each core element has a pair of longitudinally extending arms which cross at the axial center of the core element. The portions of the arms extending outwardly from the axial center of the core element are reversely bent so that they are radially and tangentially resilient. The arm ends are configured so that adjacent arm ends can snap over parallel tongues which extend outwardly along the length of each member and the core element can releasably hold a plurality of panels together. The apparatus may further include a plurality of cover plates, each having a pair of parallel tongues which extend outwardly along the length of the cover plate. The tongues of each cover plate can be snapped into engagement with the core element where no members are attached. Lastly, the apparatus may include a plurality of splines, each having a cubical block portion and at least one extension which projects inside the cavity formed by members and/or cover plates attached to the same core element. The extension has transverse ridges which fit within slots in the tongues to releasably lock a member, a cover plate, and a spline into position relative to one another.

9 Claims, 6 Drawing Figures

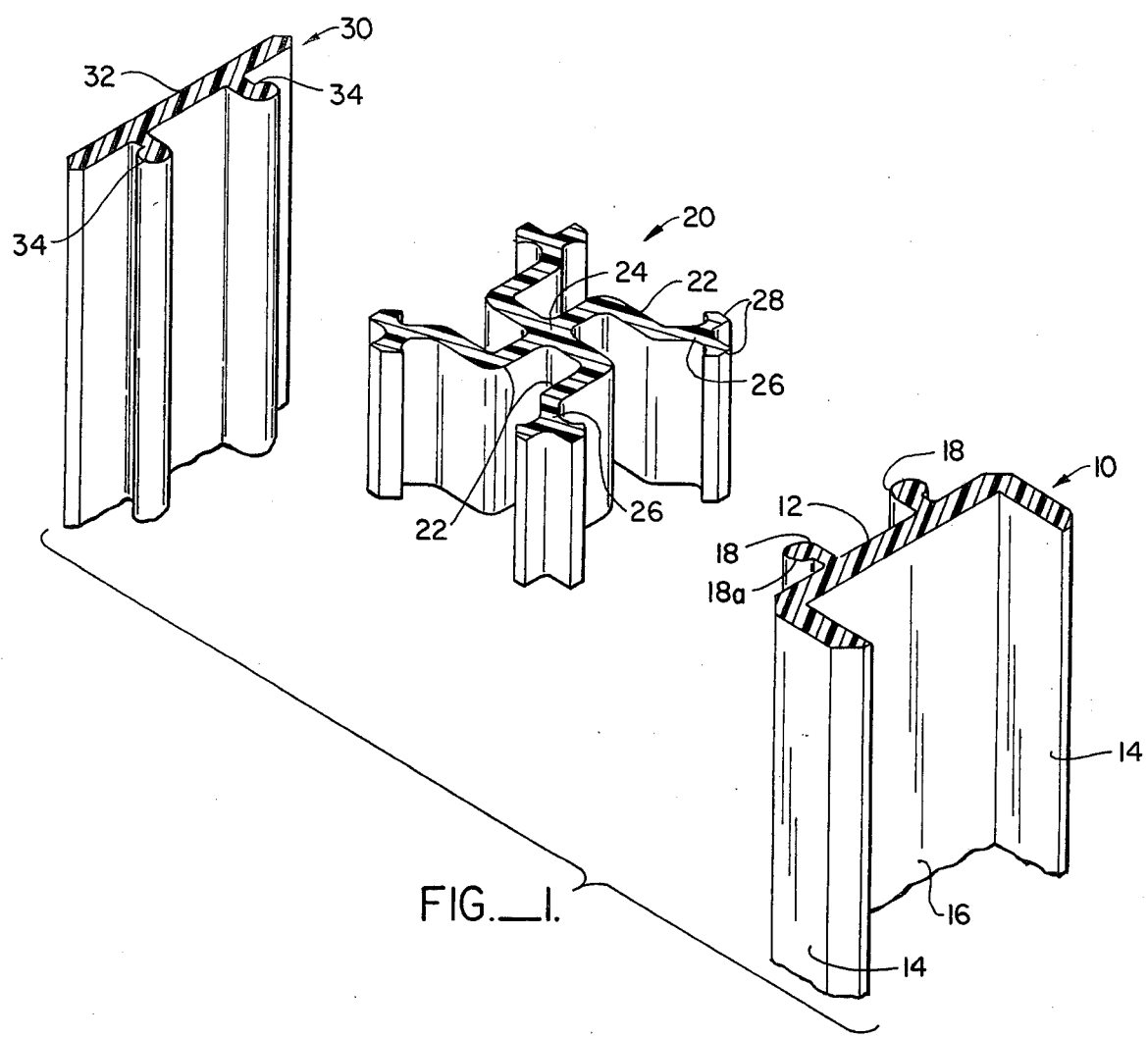
FIG._1.
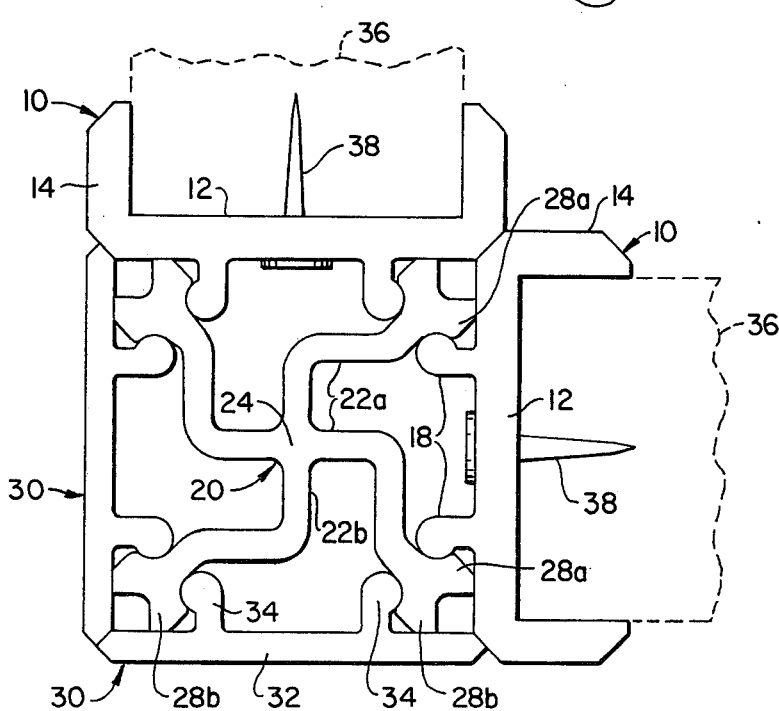
FIG._2.

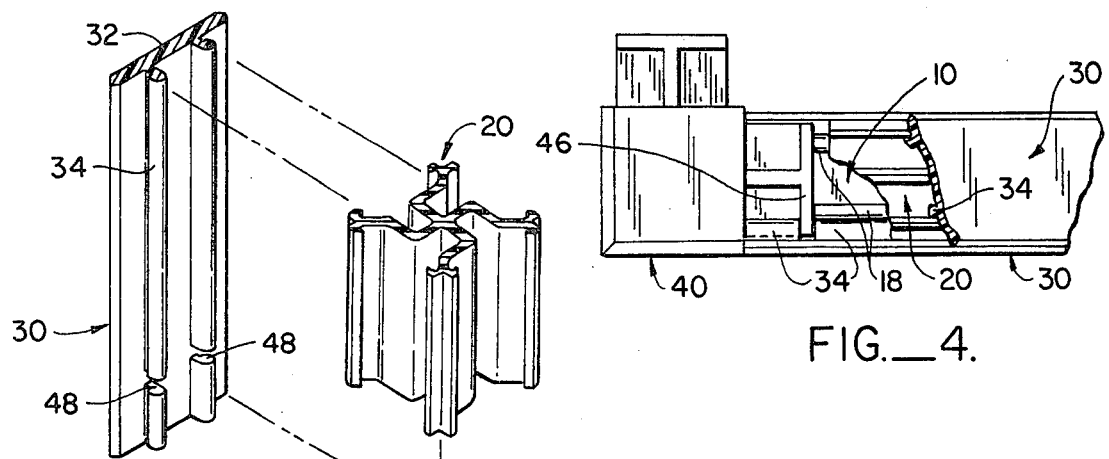
FIG._4.
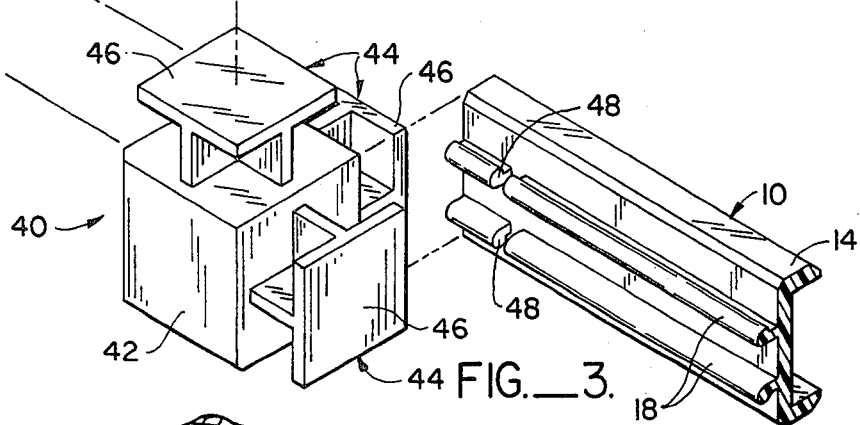
FIG._3.
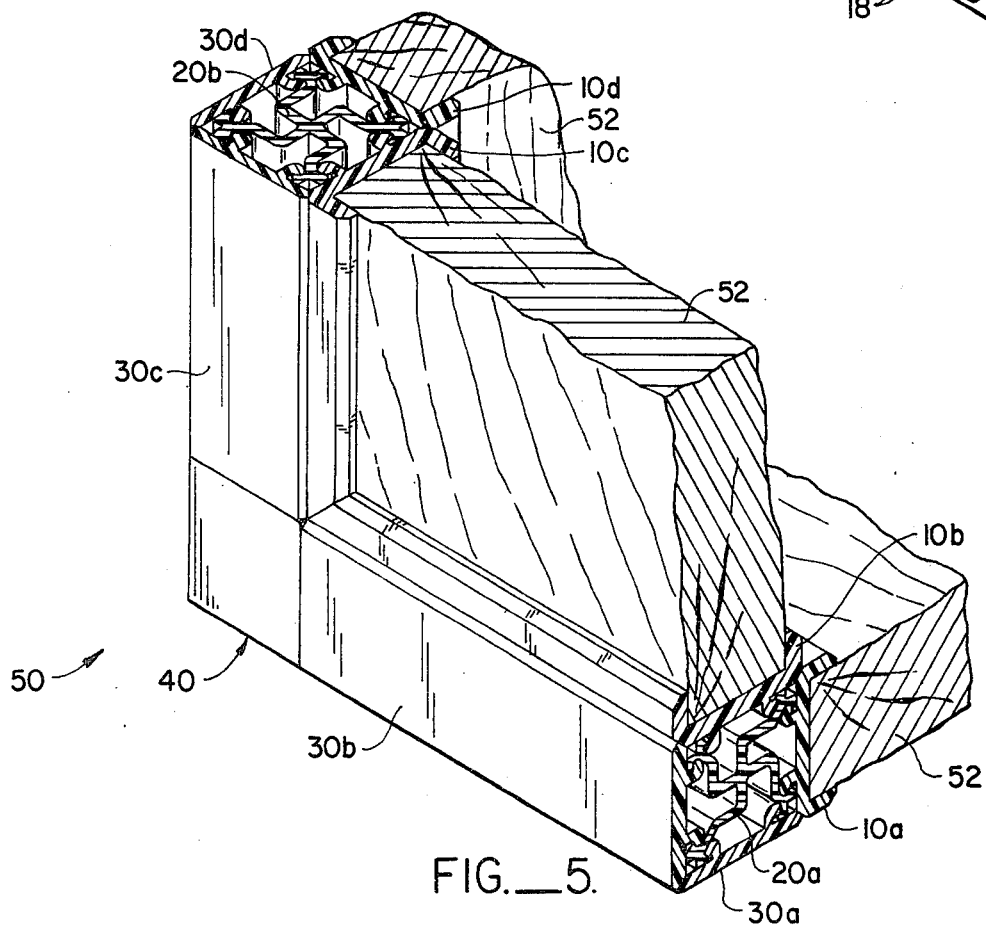
FIG._5.

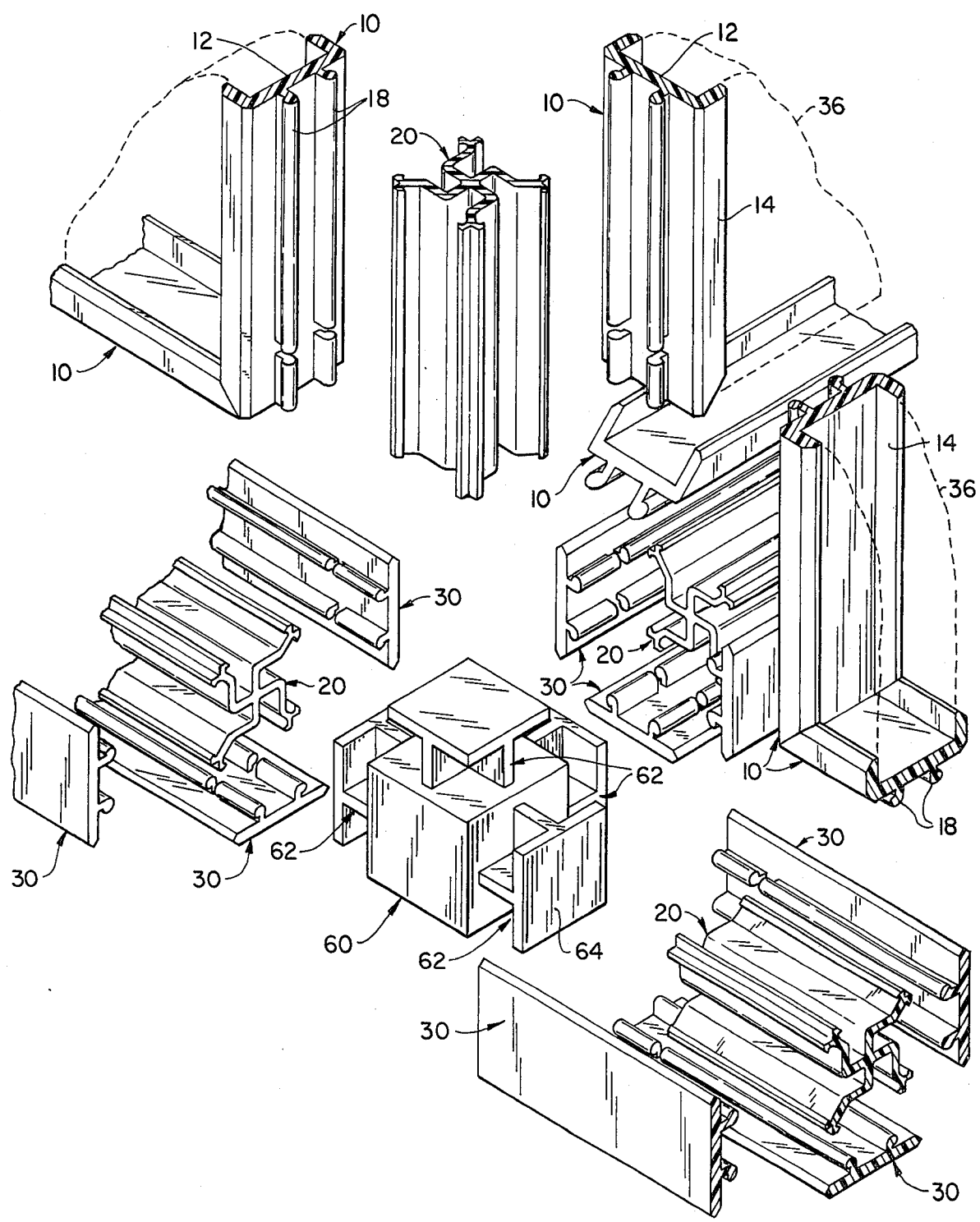
FIG._6.

APPARATUS FOR INTERCONNECTING PANELS

BACKGROUND OF THE INVENTION

The present invention relates to structural systems, and in particular to apparatus for interconnecting wall, furniture, shelf, or other structural panels.

A wide variety of structural systems have been developed to support structural panels for the construction of walls or furniture. Some of these systems are intended to be permanent, while others can be disassembled easily and can be used for temporary structures. The design of such structural systems involves a difficult compromise between aesthetic appeal and necessary structural rigidity. Several of these structural systems employ a large number of bolts and other connecting elements which provide the necessary rigidity but are aesthetically unappealing. In other systems the rigidity of the structure is sacrificed for appearance. In still others rigidity is maintained with an aesthetically appealing structure only by using various cover members over the basic structural system, and thus the structure is quite complex.

One structural system directed to these difficulties is disclosed in my U.S. Pat. No. 3,973,371 which sets forth apparatus for constructing a skeletal framework adapted to support wall, furniture or other structural panels. While it is an improvement over prior art systems it has several shortcomings. Structural panels placed in recesses in the structural framework may not be secured with sufficient rigidity. If frame elements are secured to the panel edges in advance, instead of forming a structural framework first, it may be difficult to determine which panel edges should have elements attached to them. The various flanges on the elements which define recesses for receiving panel edges may be aesthetically unappealing to some individuals.

SUMMARY OF THE INVENTION

Apparatus for interconnecting panels is disclosed which includes a plurality of members which are attached to panel edges and a plurality of core elements. Each core element has a pair of longitudinally extending arms which cross at the axial center of the core element. The portions of the arms extending outwardly from the axial center of the core element are reversely bent so that they are radially and tangentially resilient. The arm ends are configured so that adjacent arm ends can snap over parallel tongues which extend outwardly along the length of each member and the core element can releasably hold a plurality of panels together. The apparatus may further include a plurality of cover plates, each having a pair of parallel tongues which extend outwardly along the length of the cover plate. The tongues of each cover plate can be snapped into engagement with the core element where no members are attached. Lastly, the apparatus may include a plurality of splines, each having a cubical block portion and at least one extension which projects inside the cavity formed by members and/or cover plates attached to the same core element. The extension has transverse ridges which fit within slots in the tongues to releasably lock a member, a cover plate, and a spline into position relative to one another.

The apparatus of the present invention allows panels to be rapidly interconnected without the use of bolts of other fasteners and the structures produced are sufficiently rigid to allow them to be used for temporary walls, furniture, shelving, or the like. The structures can be readily disassembled. Various panels may be interconnected to form temporary walls, etc., merely by attaching panel edge members to panel edges and joining adjacent panels with core elements. It is not necessary that cover plates and splines be used, however, they improve both the aesthetic appeal and the rigidity of the structures formed.

The novel features which are believed to be characteristic of the invention, together with further objects and advantages thereof, will be better understood from the following description considered in connection with the accompanying drawings in which a preferred embodiment of the invention is illustrated by way of example. It is to be expressly understood however, that the drawings are for the purpose of illustration and description only and are not intended as a definition of the limits of the invention.

BRIEF DESCRIPTION OF THE DRAWINGS

FIG. 1 is a fragmentary perspective view of the cover plate, core element, and panel edge member of the present invention;

FIG. 2 is a cross sectional view showing the manner in which the cover plates, panel edge members, and core elements snap together;

FIG. 3 is a perspective view of one of the splines of the present invention together with a fragmentary perspective view of a cover plate, a core element, and a panel edge member;

FIG. 4 is a partially broken away view illustrating the locking action of the present invention;

FIG. 5 is a fragmentary perspective view of a junction formed in accordance with the present invention;

FIG. 6 is an exploded view of another type of junction formed in accordance with the present invention.

DESCRIPTION OF THE PREFERRED EMBODIMENT

Referring to FIG. 1, each panel edge member 10 has a flat portion 12 and perpendicularly extending sidewalls 14 which define a recess 16 for receiving the edge of a panel (not shown). A pair of parallel tongues 18 extend outward from flat portion 12 in a direction away from the panel edge and along substantially the entire length of member 10.

Each core element 20 has a pair of longitudinally extending reversely bent arms 22 which cross at right angles relative to one another at approximately their midpoints at the axial center 24 of the core element. The distance between adjacent arm ends 26 substantially corresponds to the distance between tongues 18. Each arm end is provided with a pair of divergent, longitudinally extending ribs 28. Each rib is shaped so that it will partially surround the rounded portion 18a of a tongue.

Each cover plate 30 has a generally flat portion 32 and a pair of parallel tongues 34 which extend outward from flat portion 32 along substantially the entire length of the cover plate. Tongues 34 have substantially the same configuration as tongues 18 and the distance between tongues 34 is the same as that between tongues 18.

Referring to FIG. 2, two panel edge members 10 are shown attached to the adjacent edges of orthogonally extending panels 36 (shown in phantom lines) by nails 38. The panel edge members may be attached to panel edges in any convenient manner, for example glue or other adhesive may be used. Core element 20 is positioned between panel edge members 10 so that it is generally parallel along its length with the panel edge members. Core element 20 is preferably shorter in length than the cover plates and panel edge members (see FIGS. 3 and 4) and it is disposed intermediate the length of the cover plates and panel edge members.

If core element 20 is made of a material such as plastic, the portions of the arms extending outwardly from the axial center of the core element will be radially and tangentially resilient since they are reversely bent. Adjacent arm portions 22a will slightly bend apart when ribs 28a are snapped around tongues 18 of a panel edge member 10 and will thereafter tend to spring back to their original positions to form a releasable grasping connection between the core element and panel edge member. In a like manner adjacent arm portions 22a and 22b will slightly bend apart when ribs 28b are snapped around tongues 34 of cover plate 30 and will thereafter tend to spring back to their original positions to form a releasable grasping connection between core element 20 and cover plate 30. Core element 20 is connected to the other panel edge member and cover plate in the same fashion.

It is important for purposes of the present invention that the arms be reversely bent. If they extend directly outward from axial center 24 the ability for adjacent arm ends to spring apart and the resulting grasping action is diminished.

Referring to FIG. 3, each spline 40 has a cubical block portion 42 and a plurality of orthogonal extensions 44. The number and location of extensions 44 will vary depending on the type of junction. For example, if four panels are interconnected by a single core element, a spline with one extension can be used to fill the gap between the adjacent panel edge members. Each extension 44 terminates in a transverse planar portion 46 and is adapted to project inside the cavity formed by panel edge members and/or cover plates attached to the same core element.

Each tongue 18 and each tongue 34 has a slot 48 formed proximate each end thereof. As shown in FIG. 4 transverse planar portion 46 of spline 40 engages slots 48 of tongues 18. When a cover plate such as 30 is snapped onto core element 20 transverse planar portion 46 engages slots 48 of tongues 34. In this manner spline 40, panel edge member 10, and cover plate 30 are releasably locked into position relative to one another.

A completed junction 50 between three panels 52 formed in accordance with the present invention is illustrated by way of reference to FIG. 5. In this FIGURE, panel edge members 10a, 10b, 10c, and 10d are visible. They have been attached to the edges of panels 52. Core elements 20a and 20b are visible. Along with a third core element, core elements 20a and 20b hold the panels together. Spline 40, cover plates 30a, 30b, 30c, 30d, and two other cover plates (not shown) are snapped into position to complete the junction.

An alternate form of a junction formed with the apparatus of the present invention is illustrated by way of reference to FIG. 6. Three panels are held together in a "T" configuration. In this type of junction a spline 60 is provided which has four orthogonal extensions 62, each of which has a transverse planar portion 64. The panels are interconnected by panel edge members, core elements, and cover plates as indicated.

While a preferred embodiment of the present invention has been illustrated in detail, it is apparent that modifications and adaptions of the embodiment will occur to those skilled in the art. However, it is to be expressly understood that such modifications and adaptions are within the spirit and scope of the present invention as set forth in the following claims.

What is claimed as new is:

1. Apparatus for interconnecting panels comprising:
   a plurality of elongate panel edge members having one side adapted for attachment to respective edges of the panels, and an opposite side including a pair of parallel tongues extending outwardly from the member in a direction away from the panel edge along substantially the entire length of the member;
   a plurality of elongate core elements, each core element adapted to be positioned generally parallel to adjacent members attached to panel edges, each core element having a pair of longitudinally extending arms crossing at substantially the axial center of the core element, each arm including a reversably bent portion on each side of the axial center of the core element so that the arms are both radially and tangentially resilient, the distance between adjacent arm ends substantially corresponding to the distance between the tongues of the members; and
   means at the ends of each arm for establishing a fitting connection with a tongue so that each pair of adjacent arm ends can releasably grasp the tongues of a member attached to a panel edge whereby a plurality of panels can be interconnected.

2. Apparatus according to claim 1 wherein the arms cross at right angles relative to one another.

3. Apparatus according to claim 1 wherein the arms are equal in length and are crossed at approximately their mid-points.

4. Apparatus according to claim 1 wherein the tongues have outer portions which are substantially rounded.

5. Apparatus according to claim 4 wherein the means for establishing a fitting connection comprises a pair of divergent, longitudinally extending ribs, one rib of each pair adapted to partially surround the rounded portion of a tongue of one member and the other rib of each pair adapted to partially surround the rounded portion of a tongue of a member adjacent to the one member.

6. Apparatus according to claim 1 and further comprising a plurality of generally flat cover plates, one side of each of the cover plates having a pair of parallel tongues extending outwardly along substantially the entire length of the cover plate, the distance between the cover plate tongues substantially corresponding to the distance between adjacent arm ends so that adjacent arm ends can releasably grasp the tongues of the cover plate.

7. An apparatus according to claim 6 wherein the core elements are substantially shorter than, and disposed intermediate the length of the panel edge members and cover plates, and each tongue has a slot adjacent each of its ends, and the apparatus further comprises a plurality of splines, each having a generally cubical block portion and at least one extension from the block portion which projects inside the cavity formed by a panel edge member and a cover plate attached to the same core element, the extension including transverse ridges fitting within the slots in the tongues of the panel edge member and cover plate to releasably lock the spline, panel edge member and cover plate into position relative to one another.

8. Apparatus for interconnecting panels comprising:
a plurality of elongate panel edge members having one side adapted for attachment to respective edges of the panels, and an opposite side including a pair of parallel tongues extending outwardly from the member in a direction away from the panel edge along substantially the entire length of the member, the tongues having outer portions which are substantially rounded;
a plurality of elongate core elements, each core element adapted to be positioned generally parallel to adjacent members attached to panel edges, each core element having a pair of longitudinally extending arms crossing at substantially the axial center of the core element, each arm including a reversably bent portion on each side of the axial center of the core element so that the arms are both radially and tangentially resilient, the distance between adjacent arm ends substantially corresponding to the distance between the tongues of the members; and
a pair of divergent, longitudinally extending ribs at the ends of each arm, one rib of each pair adapted to partially surround the rounded portion of a tongue of one member and the other rib of each pair adapted to partially surround the rounded portion of a tongue of a member adjacent to the one member, whereby each pair of adjacent arm ends can releasably grasp the tongues of a member attached to a panel edge and a plurality of panels can be interconnected.

9. Apparatus for interconnecting panels comprising:
a plurality of elongate panel edge members having one side adapted for attachment to respective edges of the panels, and an opposite side including a pair of parallel tongues extending outwardly from the member in a direction away from the panel edge along substantially the entire length of the member, each tongue having an outer portion which is substantially rounded and a slot adjacent each of its ends;
a plurality of generally flat cover plates corresponding in length to the length of the panel edge members, one side of each side of the cover plates having a pair of parallel tongues extending outwardly along substantially the entire length of the cover plate, the distance between the cover plate tongues substantially corresponding to the distance between the panel edge member tongues, each cover plate tongue having an outer portion which is substantially rounded and a slot adjacent each of its ends;
a plurality of elongate core elements which are substantially shorter in length than the panel edge members and cover plates, each core element adapted to be positioned in collinear fashion between adjacent and parallel panel edge members and cover plates intermediate their lengths, each core element having a pair of longitudinally extending arms crossing at substantially the axial center of the core element, each arm including a reversely bent portion on each side of the axial center of the core element so that the arms are both radially and tangentially resilient, the distance between adjacent arms ends substantially corresponding to the distance between the tongues;
a pair of divergent, longitudinally extending ribs at the end of each arm, one rib of each pair adapted to partially surround the rounded portion of a tongue so that each pair of adjacent arm ends of a core element can snap around a pair of tongues and a core element will form a releasable grasping connecting between panel edge members and/or cover plates; and
a plurality of splines, each having a generally cubical block portion and at least one extension from the block portion which projects inside the cavity formed by panel edge members and/or cover plates attached to the same core element, the extension including transverse ridges fitting within the slots in the tongues of the panel edge members and cover plates to releasably lock the spline, panel edge members and cover plates into position relative to one another.

* * * * *